(12) United States Patent
Shiraki et al.

(10) Patent No.: US 10,890,855 B2
(45) Date of Patent: Jan. 12, 2021

(54) POWER SUPPLY APPARATUS AND IMAGE FORMING APPARATUS FOR DETERMINING MALFUNCTION OR LOAD ABNORMALITY

(71) Applicant: CANON KABUSHIKI KAISHA, Tokyo (JP)

(72) Inventors: Yohei Shiraki, Toride (JP); Hirohisa Nakajima, Tsukubamirai (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/559,760

(22) Filed: Sep. 4, 2019

(65) Prior Publication Data
US 2020/0089141 A1 Mar. 19, 2020

(30) Foreign Application Priority Data
Sep. 13, 2018 (JP) .................. 2018-171677

(51) Int. Cl.
| | | |
|---|---|---|
| *G03G 15/02* | (2006.01) | |
| *G03G 15/00* | (2006.01) | |
| *G06K 15/00* | (2006.01) | |

(52) U.S. Cl.
CPC ..... *G03G 15/0266* (2013.01); *G03G 15/5004* (2013.01); *G03G 15/55* (2013.01); *G06K 15/4055* (2013.01)

(58) Field of Classification Search
None
See application file for complete search history.

(56) References Cited

U.S. PATENT DOCUMENTS

2016/0202643 A1* 7/2016 Nakajima .............. G03G 15/80
 399/9
2018/0196386 A1 7/2018 Shiraki

FOREIGN PATENT DOCUMENTS

JP 2002-333812 11/2002
JP 2004102079 A * 4/2004

OTHER PUBLICATIONS

JP_2004102079_A_T MachineTranslation, 2004, Japan, Yamaguchi.*
U.S. Appl. No. 16/658,869, filed Oct. 21, 2019 by Hirohis Nakajima.

* cited by examiner

*Primary Examiner* — Victor Verbitsky
(74) *Attorney, Agent, or Firm* — Venable LLP (57) ABSTRACT

A power supply apparatus includes: a power supply circuit configured to generate a bias voltage and output the bias voltage to a load, the power supply circuit being configured to output a determination signal and a detection current signal, the determination signal being binarized and representing a result obtained by comparing a voltage value according to the bias voltage with a threshold, the detection current signal indicating a current value of a load current flowing between the power supply circuit and the load, the load current flowing in response to outputting of the bias voltage; and a controller configured to control generation of the bias voltage generated by the power supply circuit, and determine a malfunction of the power supply circuit and an abnormality in the load, based on the determination signal and the detection current signal.

15 Claims, 9 Drawing Sheets

| Determination Signal | | Detection Current Signal | | Abnormal Location | Determination |
|---|---|---|---|---|---|
| T603 | T605 | T603 | T605 | | |
| H | L | LARGER THAN ELECTRIC LEAKAGE THRESHOLD | BETWEEN PROTECTION THRESHOLD AND ELECTRIC LEAKAGE THRESHOLD | NONE (NORMAL) | NORMAL |
| L | L | PROTECTION THRESHOLD | PROTECTION THRESHOLD | HIGH-VOLTAGE CIRCUIT | EXCESSIVE OUTPUT |
| H | H | PROTECTION THRESHOLD | PROTECTION THRESHOLD | LOAD | ELECTRIC LEAKAGE (LARGE) |
| H | L | BETWEEN PROTECTION THRESHOLD AND ELECTRIC LEAKAGE THRESHOLD | BETWEEN PROTECTION THRESHOLD AND ELECTRIC LEAKAGE THRESHOLD | LOAD | ELECTRIC LEAKAGE (SMALL) |
| H | H | LARGER THAN ELECTRIC LEAKAGE THRESHOLD | LARGER THAN ELECTRIC LEAKAGE THRESHOLD | HIGH-VOLTAGE CIRCUIT | NO OUTPUT |
| H | L | LARGER THAN ELECTRIC LEAKAGE THRESHOLD | LARGER THAN ELECTRIC LEAKAGE THRESHOLD | LOAD | ATTACHMENT FAILURE OF PHOTOSENSITIVE MEMBER |

POWER SUPPLY APPARATUS AND IMAGE FORMING APPARATUS FOR DETERMINING MALFUNCTION OR LOAD ABNORMALITY

BACKGROUND OF THE INVENTION

Field of the Invention

The present disclosure relates to a technology of determining a malfunction of a power supply circuit and an abnormality in a load of the power supply circuit.

Description of the Related Art

In an electrophotographic image forming apparatus, various high voltages (hereinafter referred to as bias voltages) are used for image formation. Japanese Patent Laid-Open No. 2002-333812 discloses a configuration of determining an attachment failure (non-attachment) of a photosensitive member by using a charging bias voltage, which is one of the bias voltages used by the image forming apparatus. Specifically, Japanese Patent Laid-Open No. 2002-333812 discloses a configuration of determining whether a charging current within a predetermined range is flowing after a predetermined time period from outputting the charging bias voltage, to thereby determine an attachment failure of a photosensitive member and non-attachment of a photosensitive member.

Japanese Patent Laid-Open No. 2002-333812, however, does not suppose a malfunction of a charging high-voltage circuit that outputs a charging bias voltage. Specifically, in the configuration of Japanese Patent Laid-Open No. 2002-333812, an attachment failure of a photosensitive member may be determined also in a case where a charging current is not flowing due to a malfunction of the charging high-voltage circuit. Further, for example, an excessive charging current flows in a case where a load abnormality in the charging high-voltage circuit, such as condensation on a photosensitive member and a transfer roller, occurs. Similarly, an excessive charging current flows also in a case where the charging high-voltage circuit outputs an excessive charging bias voltage due to a malfunction. Accordingly, whether it is a load abnormality in a photosensitive member or the like or whether it is a malfunction of a charging high-voltage circuit cannot be determined only based on a charging current.

SUMMARY OF THE INVENTION

According to an aspect of the present invention, a power supply apparatus includes: a power supply circuit configured to generate a bias voltage and output the bias voltage to a load, the power supply circuit being configured to output a determination signal and a detection current signal, the determination signal being binarized and representing a result obtained by comparing a voltage value according to the bias voltage with a threshold, the detection current signal indicating a current value of a load current flowing between the power supply circuit and the load, the load current flowing in response to outputting of the bias voltage to the load; and a controller configured to control generation of the bias voltage generated by the power supply circuit, and determine a malfunction of the power supply circuit and an abnormality in the load, based on the determination signal and the detection current signal.

Further features of the present disclosure will become apparent from the following description of exemplary embodiments with reference to the attached drawings.

DESCRIPTION OF THE EMBODIMENTS

In the following, an exemplary embodiment of the present invention will be described with reference to the drawings. Note that the following embodiment is merely an example, and the present invention is not limited to details of the embodiment. Further, in the drawings described below, components that are not necessary for the description of the embodiment are omitted from the drawings.

Figure 1:
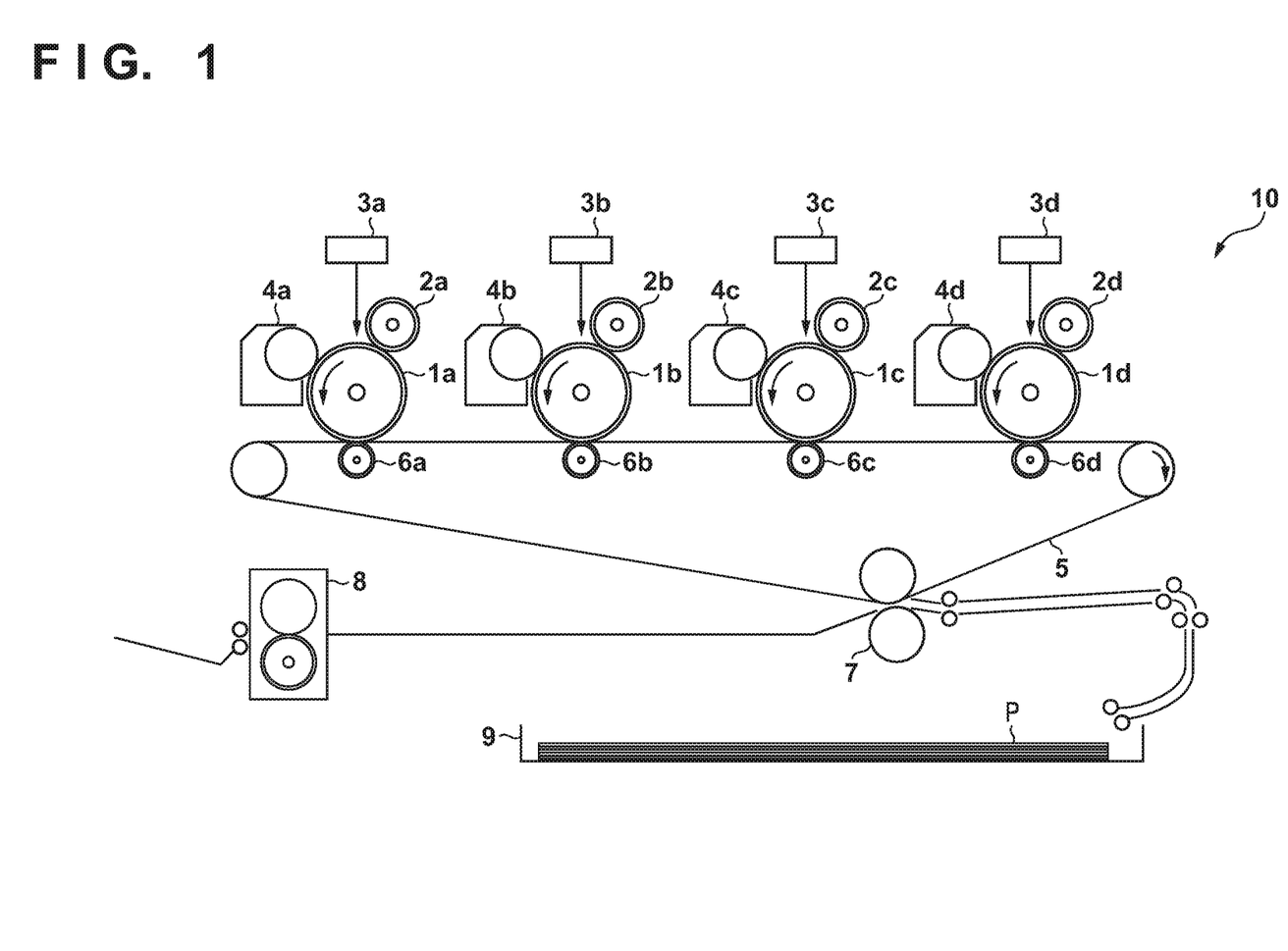
FIG. 1 is a configuration diagram of an image forming apparatus.

FIG. 1 is a configuration diagram of an image forming apparatus 10 according to the present embodiment. The image forming apparatus 10 includes four image forming units for forming respective toner images of yellow, cyan, magenta, and black. In FIG. 1, members having the same letter at the end of their reference signs are components of the same image forming unit. Note that image forming units constituted with members whose letters at the end are denoted by a, b, c, and d form toner images of yellow, cyan, magenta, and black, respectively. In the following description, reference signs without the letters at the end will be used, unless the colors need to be distinguished from each other. A photosensitive member 1 is rotationally driven in a counterclockwise direction in the drawing during an image-forming period. A charging roller 2 outputs a charging bias voltage, to thereby charge a surface of the photosensitive member 1 at a uniform potential. A laser scanner 3 exposes the photosensitive member 1 to light, to thereby form an electrostatic latent image on the photosensitive member 1. A developing unit 4 outputs a developing bias voltage, to thereby cause toner to adhere onto the electrostatic latent image on the photosensitive member 1 and form a toner image on the photosensitive member 1. A primary transfer roller 6 outputs a primary transfer bias voltage, to thereby transfer the toner image of the photosensitive member 1 onto an intermediate transfer belt 5. Note that a full-color toner image can be formed on the intermediate transfer belt 5 by causing toner images of the photosensitive members 1a to 1d to be transferred onto the intermediate transfer belt 5 in a manner of being superimposed onto one another. The intermediate transfer belt 5 is rotationally driven in a clockwise direction in the drawing during an image-forming period. Therefore, the toner image transferred onto the intermediate transfer belt 5 is conveyed to a position facing a secondary transfer roller 7. The secondary transfer roller 7 outputs a secondary transfer bias voltage, to thereby transfer the toner image of the intermediate transfer belt 5 onto a recording material P that has been conveyed from a cassette 9. The recording material P on which the toner image has been transferred is conveyed to a fixing unit 8. The fixing unit 8 fixes the toner image to the recording material P. The recording material P to which the toner image has been fixed is discharged to the outside of the image forming apparatus 10.

Figure 2:
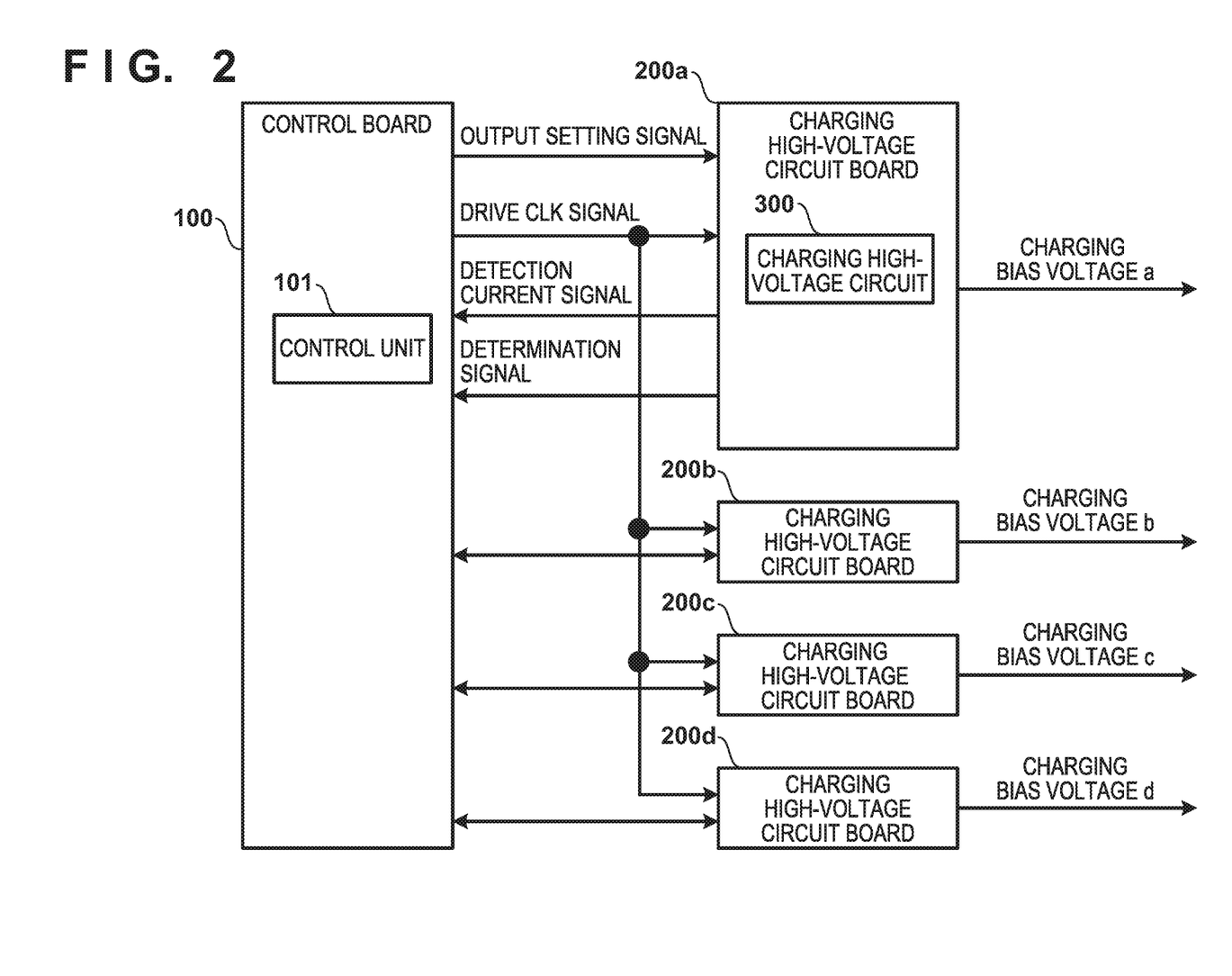
FIG. 2 is a functional block diagram of a configuration of generating a charging bias voltage.

FIG. 2 is a functional block diagram for generating a charging bias voltage. A control board 100 includes a control unit 101. Each of charging high-voltage circuit boards 200a to 200d includes a charging high-voltage circuit 300 serving as a power supply circuit. The charging high-voltage circuits 300 of the charging high-voltage circuit boards 200a to 200d generate a charging bias voltage a to a charging bias voltage d, and output the charging bias voltage a to the charging bias voltage d, respectively. Note that the charging bias voltage a to the charging bias voltage d are output to the charging rollers 2a to 2d, respectively.

During an image-forming period, the control unit 101 outputs a drive clock (CLK) signal to the charging high-voltage circuits 300 of the charging high-voltage circuit boards 200a to 200d. The drive CLK signal is a signal for driving a transformer T301 (FIG. 3) of the charging high-voltage circuit 300, and has a frequency of 50 kHz and a duty ratio of 25%, for example. Further, the control unit 101 outputs an individual output setting signal to each charging high-voltage circuit 300. For example, the output setting signal is a PWM signal of 3.4 V and 50 kHz. A duty ratio of the output setting signal is adjusted according to a charging bias voltage that the charging high-voltage circuit 300 is to output. In the present embodiment, the charging high-voltage circuit 300 is configured to output charging bias voltages of 0 V, approximately −700 V, and approximately −1500 V in a case where duty ratios of the output setting signal is 88% (3.0 V), 50% (1.7 V), and 0% (0 V), respectively. Further, the control unit 101 separately determines whether there is a malfunction in each charging high-voltage circuit 300 and whether or not there is a load abnormality in each charging high-voltage circuit 300, based on a detection current signal and a determination signal output from each charging high-voltage circuit 300. Note that the detection current signal and the determination signal will be described later. In the following, with reference to FIG. 3, a configuration of the charging high-voltage circuit 300 will be described.

Figure 3:
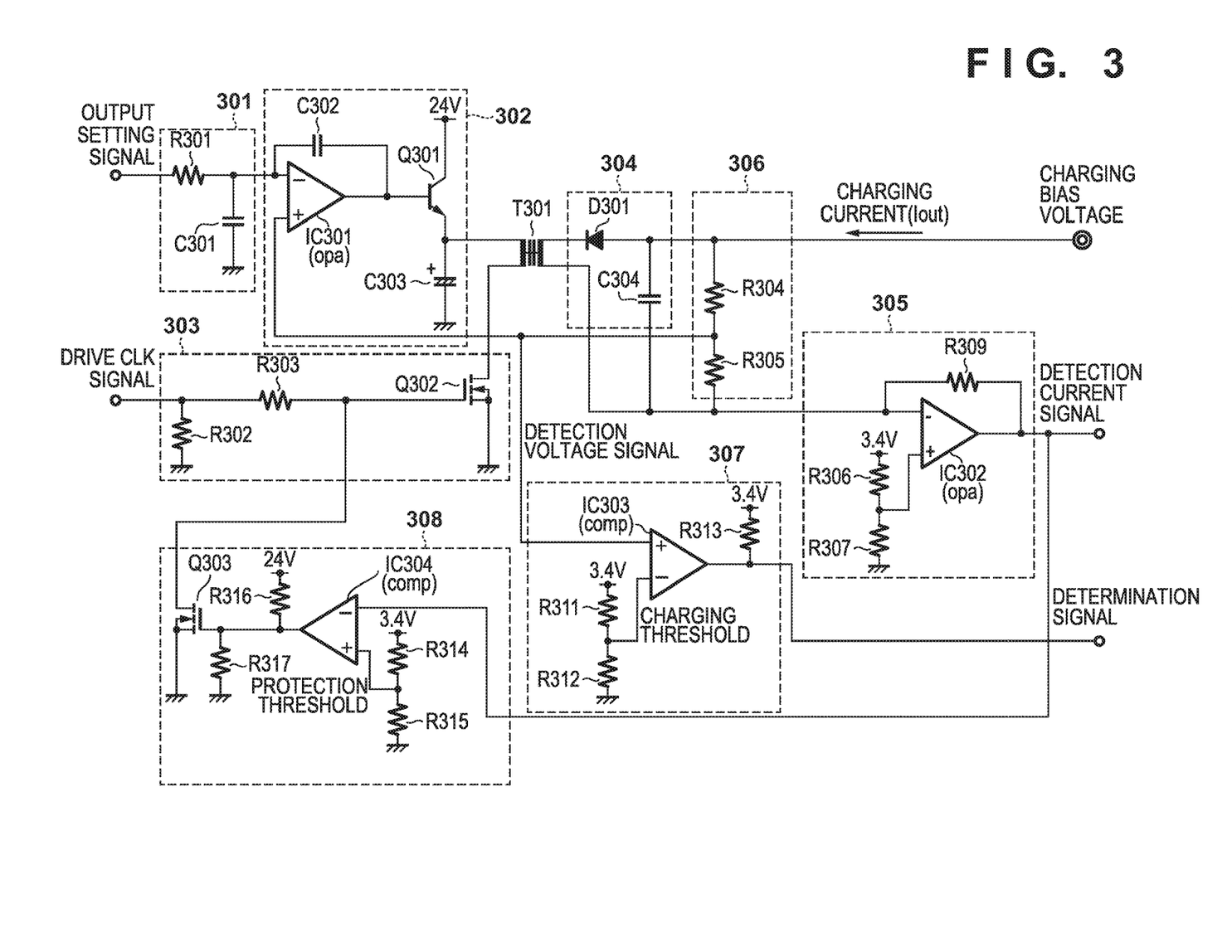
FIG. 3 is a configuration diagram of a charging high-voltage circuit.

A PWM smoothing section 301 is a low-pass filter constituted with a resistor R301 and a capacitor C301, and converts a received output setting signal into a DC voltage at a predetermined cutoff frequency.

A negative terminal of an operation amplifier IC301 of a constant voltage control section 302 receives an input of the DC voltage output from the PWM smoothing section 301, and a positive terminal receives an input of a detection voltage signal output by a voltage detector 306 to be described later. Note that a voltage of the detection voltage signal is in proportion to a charging bias voltage output by the charging high-voltage circuit 300. The operation amplifier IC301 is an inverting amplifier circuit that adjusts an output voltage such that voltages of the positive terminal and the negative terminal match. Therefore, when a DC voltage output by the PWM smoothing section 301 is reduced, an output voltage of the operation amplifier IC301 is increased. Note that a DC voltage output by the PWM smoothing section 301 is lower as a duty ratio of the output setting signal (PWM signal) is smaller. A capacitor C302 is an integral element intended to stabilize an output voltage of the inverting amplifier circuit. An output of the operation amplifier IC301 is connected to a base terminal of a transistor Q301. A voltage of an emitter terminal of the transistor Q301 is lower than a voltage of an output terminal of the operation amplifier IC301 by an amount corresponding to a voltage (approximately 0.6 V) between a base and an emitter of the transistor Q301. The transistor Q301 is connected to a power supply of 24 V at a collector terminal and is connected to an electrolytic capacitor C303 for voltage stabilization at an emitter terminal.

A transformer drive section 303 is a circuit for driving the transformer T301, and includes a pull-down resistor R302, a damping resistor R303, and an FET Q302. The FET Q302 repeatedly turns on and off, according to the drive CLK signal. According to the on and off states of the FET Q302, a primary-side current of the transformer T301 is controlled. Further, an output of an overcurrent protection section 308 to be described later is connected to a gate terminal of the FET Q302. In a case where the overcurrent protection section 308 detects an overcurrent, the overcurrent protection section 308 connects the gate terminal of the FET Q302 to ground to thereby stop drive of the transformer T301.

A high-voltage rectifying section 304 is constituted with a high-voltage diode D301 and a high-voltage ceramic capacitor C304. The high-voltage rectifying section 304 rectifies and smoothes a negative alternating voltage output from the transformer T301, and outputs a negative direct current voltage as a charging bias voltage.

A positive terminal of an operation amplifier IC302 of a current detector 305 receives an input of a voltage obtained by dividing a predetermined voltage (3.4 V) with a resistor R306 and a resistor R307. In the present example, the resistor R306 is set to 2 kΩ, and the resistor R307 is set to 15 kΩ Thus, the positive terminal of the operation amplifier IC302 receives an input of 3.0 V. A negative terminal of the operation amplifier IC302 receives an input of the charging bias voltage via a resistor R304 and a resistor R305 of the voltage detector 306. Further, an output voltage of the operation amplifier IC302 is connected to the negative terminal of the operation amplifier IC302 via a resistor R309. In the present example, the resistor R309 is set to 20 kΩ.

The operation amplifier IC302 controls a voltage of a detection current signal to be output, such that a voltage of the negative terminal is 3.0 V, which is the same voltage as a voltage of the positive terminal. Here, a load current (hereinafter referred to as a charging current (Iout)) flowing through the charging roller 2 serving as a load flows through the resistor R309, and therefore the detection current signal has a voltage in proportion to a current value of the charging current. Specifically, in a case where operation of the charging high-voltage circuit 300 stops and the charging current is 0, a voltage of the detection current signal is 3.0 V, which is the same voltage as a voltage of the positive terminal of the operation amplifier IC302. In contrast, for example, in a case where the charging current is 100 μA, a voltage drop of 2 V occurs across the resistor R309 (20 kΩ), and therefore a voltage of the detection current signal is 1.0 V. As is described above, the detection current signal is a signal indicating a current value of the charging current.

The voltage detector 306 is constituted with the resistor R304 and the resistor R305. In the present example, the resistor R304 is set to 5 MΩ, and the resistor R305 is set to 7.5 kΩ. The voltage detector 306 divides the charging bias voltage and a voltage (3.0 V) of the negative terminal of the operation amplifier IC302 with the resistor R304 and the resistor R305, and outputs the divided voltage as a detection voltage signal. For example, in a case where the charging bias voltage is 0 V, the detection voltage signal is 3.0 V. In contrast, in a case where the charging bias voltage is −1500 V, a voltage of the detection voltage signal is 0.9 V. As described above, the detection voltage signal is input into the positive terminal of the operation amplifier IC301 of the constant voltage control section 302.

A negative terminal of a comparator IC303 of a charging output determination section 307 receives an input of a charging threshold voltage Vth obtained by dividing a predetermined voltage (3.4 V) with a resistor R311 and a resistor R312, and the predetermined voltage is compared to the charging threshold voltage Vth. In the present example, the resistor R311 is set to 10 kΩ, and the resistor R312 is set to 10 kΩ. Thus, the charging threshold voltage Vth is 1.7 V. The detection voltage signal from the voltage detector 306 is applied to a positive terminal of the comparator IC303. An output of the comparator IC303 has high impedance in a case where a voltage of the positive terminal is higher than a voltage of the negative terminal. In other cases, the output of the comparator IC303 is 0 V. An output of the comparator IC303 is pulled up to 3.4 V via a resistor R313, and is output to the control unit 101 as a determination signal. Therefore, in a case where a voltage of the positive terminal of the comparator IC303 is higher than a voltage of the negative terminal, the determination signal is at a high level. In other cases, the determination signal is at a low level. For example, while an output of the charging bias voltage is stopped, i.e., in a case where the charging bias voltage is 0 V, the detection voltage signal is 3.0 V as described above. This voltage is higher than the charging threshold voltage Vth, and therefore the determination signal is at a high level. Further, in a case where the charging bias voltage is −1500 V, the detection voltage signal has 0.75 V as described above. This voltage is lower than the charging threshold voltage Vth, and therefore the determination signal is at a low level. As is described above, the determination signal is a signal obtained by binarizing a voltage value according to the charging bias voltage.

The overcurrent protection section 308 operates such that the charging current does not exceed an upper limit value of 100 μA even when a resistance value of a load is reduced. A protection threshold voltage obtained by dividing a reference voltage (3.4 V) with a resistor R314 and a resistor R315 is applied to a positive terminal of a comparator IC304. In the present example, the resistor R314 is set to 24 kΩ, and the resistor R315 is set to 10 kΩ. Therefore, the protection threshold voltage is 1 V. The detection current signal is applied to a negative terminal of the comparator IC304. An output terminal of the comparator IC304 is connected to a gate terminal of a FET Q303. As described above, a voltage of the detection current signal is smaller as the charging current is larger. In a case where a voltage of the detection current signal is reduced lower than the protection threshold voltage, the output terminal of the comparator IC304 has high impedance. In a case where the output terminal of the comparator IC304 has high impedance, a voltage divided by a resistor R316 and a resistor R317 is applied to the gate terminal of the FET Q303, causing the FET Q303 to be conducted. As a result, the FET Q302 of the transformer drive section 303 is turned off. This stops drive of the transformer T301, which in turn stops output of the charging bias voltage. In a case where the charging current is reduced due to the stoppage of output of the charging bias voltage, protection operation performed by the overcurrent protection section 308 is stopped, and the transformer drive section 303 thereby restarts operation. Consequently, the charging current is controlled by constant current control with a threshold of 100 μA.

The charging current flows in a case where the charging bias voltage is equal to or larger than a discharge start voltage. The discharge start voltage is a voltage at which electric discharge from the charging roller 2 to the photosensitive member 1 starts to occur. However, in a case where electric leakage occurs due to condensation or the like, the charging current flows even when a voltage is less than the discharge start voltage. For this reason, the control unit 101 determines that electric leakage occurs in a case where a charging current having a predetermined value or larger flows even though a value of the charging bias voltage set based on the output setting signal is less than the discharge start voltage. In the present example, the predetermined value is referred to as an electric leakage threshold, and a value of the electric leakage threshold is set to 10 μA. Note that the control unit 101 determines a value of the charging current, based on the detection current signal. For example, a state in which the detection current signal has 2.8 V is equivalent to a state in which the charging current has 10 μA. Therefore, the control unit 101 determines that electric leakage occurs in a case where a voltage of the detection current signal is equal to or less than 2.8 V even though a value of the charging bias voltage set based on the output setting signal is less than the discharge start voltage. Note that a voltage (2.8 V) corresponding to the electric leakage threshold (10 μA) is referred to as an electric leakage threshold voltage.

Figure 4:
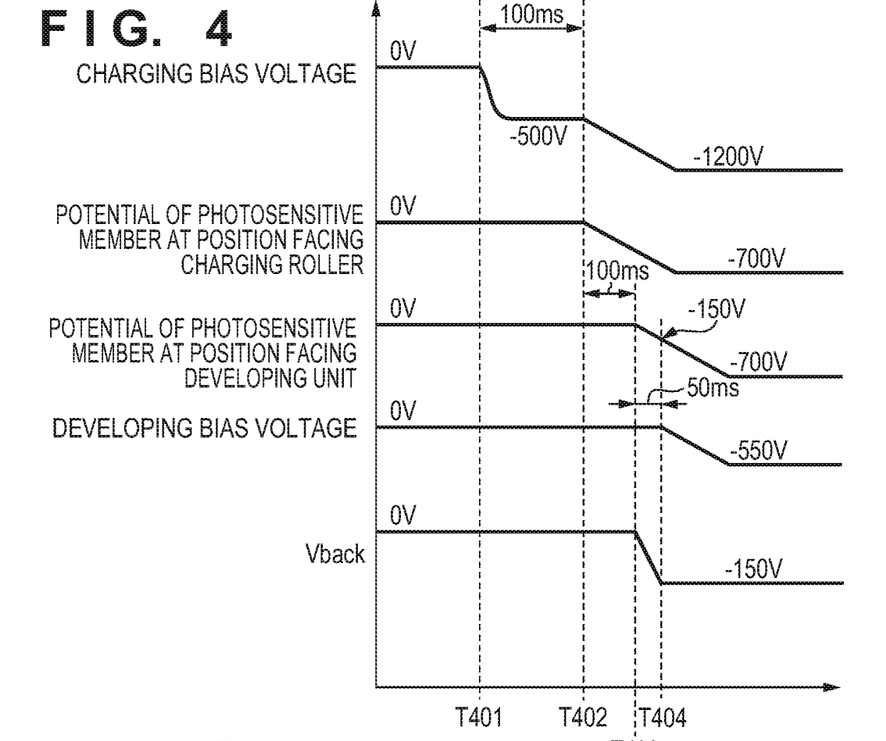
FIG. 4 is a timing chart concerning a value of a charging bias voltage.

FIG. 4 is a timing chart of a startup sequence of the charging bias voltage when image formation is started. When image formation is started, at a timing T401, the control unit 101 sets an output setting signal such that a first target value is output as a charging bias voltage. The first target value is set based on a discharge start voltage. Note that the discharge start voltage varies depending on temperature and humidity conditions, and varies within a range between −400 V and −700 V, for example. In a case where the charging bias voltage is equal to or larger than the discharge start voltage, a difference between the charging bias voltage and the discharge start voltage is a potential of the photosensitive member 1. For example, in a case where the discharge start voltage is −500 V and the charging bias voltage is −1200 V, a potential of the photosensitive member 1 is −700 V. For example, the first target value is set to a maximum value in a range of the charging bias voltage that does not allow a charging current to flow. Alternatively, the first target value is set such that, even if a charging current flows, a value of the charging current is less than a predetermined value (10 μA in the present embodiment) for determining electric leakage.

At a timing T402 that is 100 ms after the timing T401, the control unit 101 starts to change the charging bias voltage so as to have a second target value. The second target value is determined based on a potential (image formation voltage V2) that is necessary for the photosensitive member 1 to form an image, and is set to −1200 V in the present embodiment. Note that, in the present example, in a case where the charging bias voltage is −1200 V, a charging current of 50 μA flows. As illustrated in FIG. 4, in the present embodiment, the charging bias voltage is changed at a rate of 3 V per millisecond (hereinafter referred to as slope control). Therefore, at a timing T403 that is 100 ms after the timing T402, the charging bias voltage is −800 V. Further, at a timing T404 that is 50 ms after the timing T403, the charging bias voltage is −950 V. Note that, for example, in a case where a discharge start voltage V1 is −500 V, as illustrated in FIG. 4, a potential of the photosensitive member 1 at a position facing the charging roller 2 is 0 V between the timing T401 and the timing T402. Further, at the timing T402 and later, the potential of the photosensitive member 1 at the position facing the charging roller 2 changes depending on change of the charging bias voltage, and is −300 V at the timing T403 and −450 V at the timing T404. Then, in a case where the charging bias voltage is −1200 V, the potential of the photosensitive member 1 at the position facing the charging roller 2 is −700 V.

In the present embodiment, time required for a surface of the photosensitive member 1 to be moved from the position facing the charging roller 2 to a position facing the developing unit 4 due to rotation of the photosensitive member 1 is 100 ms. Therefore, a potential of the photosensitive member 1 at the position facing the developing unit 4 starts to change from the timing T403, as illustrated in FIG. 4. Then, at the timing T404, the potential of the photosensitive member 1 at the position facing the developing unit 4 is −150 V, as illustrated in FIG. 4. At this timing T404, the control unit 101 starts application of a developing bias voltage of −550 V. The developing bias voltage is also changed at a rate of 3 V per millisecond, similarly to the charging bias voltage. Therefore, at the timing T404 and later, a difference Vback between the potential of the photosensitive member 1 at the position facing the developing unit 4 and the developing bias voltage is maintained constant at −150 V. In this manner, at the time of starting output of the developing bias voltage. Sweeping-out of toner and carrier in the developing unit 4 can be prevented.

Note that, the first target value is first output as the charging bias voltage and then an absolute value thereof is increased as the second target value, which is for the purpose of reducing a time period in which the charging bias voltage is brought to the second target value. As described above, to prevent sweeping-out of toner and carrier in the developing unit 4, variation of Vback needs to be reduced. Thus, from the timing T402, slope control with gentle inclination is performed. Here, in a case where slope control is performed from the timing T401, a time period of 400 ms is required to bring the charging bias voltage to −1200 V. This causes a time period in which the charging bias voltage is brought to the second target value to be longer than that in a control method of FIG. 4.

Figure 5:
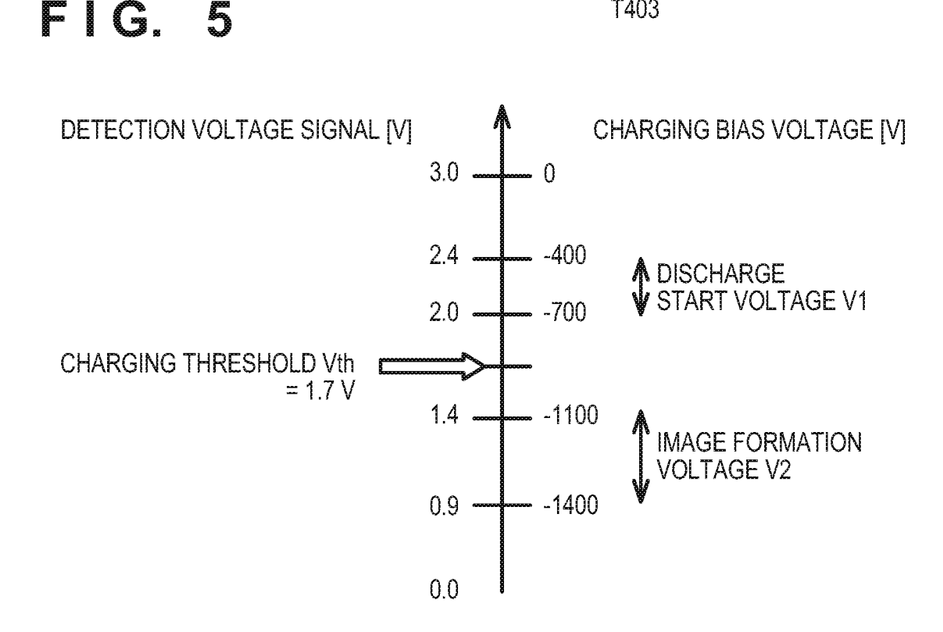
FIG. 5 is a diagram illustrating a relationship between the charging bias voltage and a detection voltage signal.

FIG. 5 illustrates a relationship between the charging bias voltage and a voltage of the detection voltage signal according to the present embodiment. For example, in a case where the charging bias voltage is −1100 V, a voltage of the detection voltage signal is 1.4 V. As illustrated in FIG. 5, the charging threshold voltage is set to 1.7 V, which is between a voltage (from 2.4 to 2.0 V) of the detection voltage signal corresponding to a range of possible voltages of the discharge start voltage V1 and a voltage (from 1.4 to 0.9 V) of the detection voltage signal corresponding to a range of possible voltages of the image formation voltage V2.

In the following, values of the charging bias voltage, the detection voltage signal, the determination signal, and the detection current signal in several states will be described with reference to FIG. 6A, FIG. 6B, FIG. 7A, FIG. 7B, FIG. 8A, and FIG. 8B.

Normal State

Figure 6A:
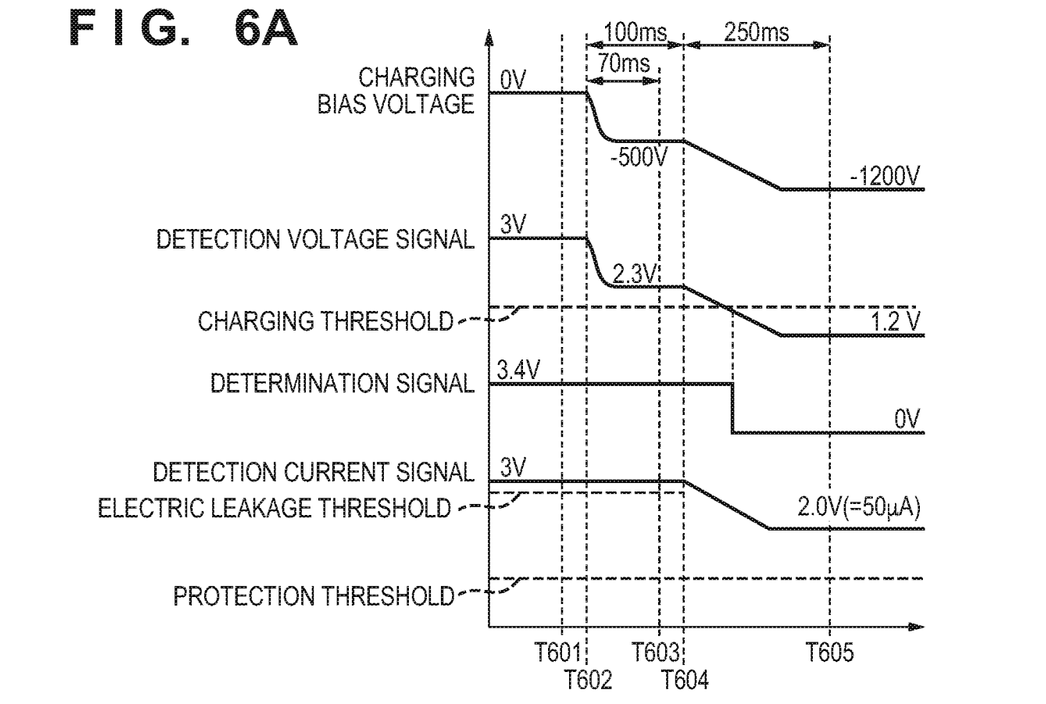
FIGS. 6A and 6B are explanatory drawings of respective signals in respective states.

FIG. 6A is a timing chart of each voltage (signal) when the apparatus is in a normal state. Note that "normal" herein refers to a state in which there is no abnormality in the charging high-voltage circuit 300, and in which the photosensitive member serving as a load does not have an attachment failure. At a timing T601, the control unit 101 outputs a drive CLK signal to drive the transformer T301. At a timing T602, based on setting of an output setting signal, the control unit 101 causes the charging high-voltage circuit 300 to output a charging bias voltage having a first target value (−500 V). At a timing T603 that is 70 ms after the timing T602, the control unit 101 determines values of a determination signal and a detection current signal. When the apparatus is in a normal state, the detection voltage signal is approximately 2.3 V, which is higher than a charging threshold voltage (1.7 V), and therefore the determination signal is at a high level. Further, a charging current does not flow at the first target value, and therefore a voltage of the detection current signal is 3.0 V, which is higher than an electric leakage threshold voltage (2.8 V). Note that the values of the determination signal and the detection current signal are determined after waiting for 70 ms from the timing T602, which is because a margin until the charging bias voltage reaches the first target value is taken into consideration.

At a timing T604 that is 100 ms after the timing T602, the control unit 101 starts to perform slope control to bring the charging bias voltage to a second target value (−1200 V). At a timing T605 that is 250 ms after the timing T604, the control unit 101 determines values of the determination signal and the detection current signal. When the apparatus is in a normal state, the detection voltage signal is 1.2 V, which is lower than the charging threshold voltage Vth, and therefore the determination signal is at a low level. Further, when the apparatus is in a normal state, a charging current has 50 µA. A voltage of the detection current signal at this time is 2 V, which is between the electric leakage threshold voltage and the protection threshold voltage. Note that values of the determination signal and the detection current signal are determined after waiting for 250 ms from the timing T604, which is because a margin until the charging bias voltage reaches the second target value is taken into consideration.

As illustrated in FIG. 6A, it can be determined that the charging high-voltage circuit 300 is normal, in a case where the determination signal is at a high level and a voltage of the detection current signal is larger than the electric leakage threshold voltage at the timing T603, and the determination signal is at a low level and a voltage of the detection current signal is between the electric leakage threshold voltage and the protection threshold voltage at the timing T605.

Malfunction of Charging High-Voltage Circuit #1 (Excessive Output)

Figure 6B:
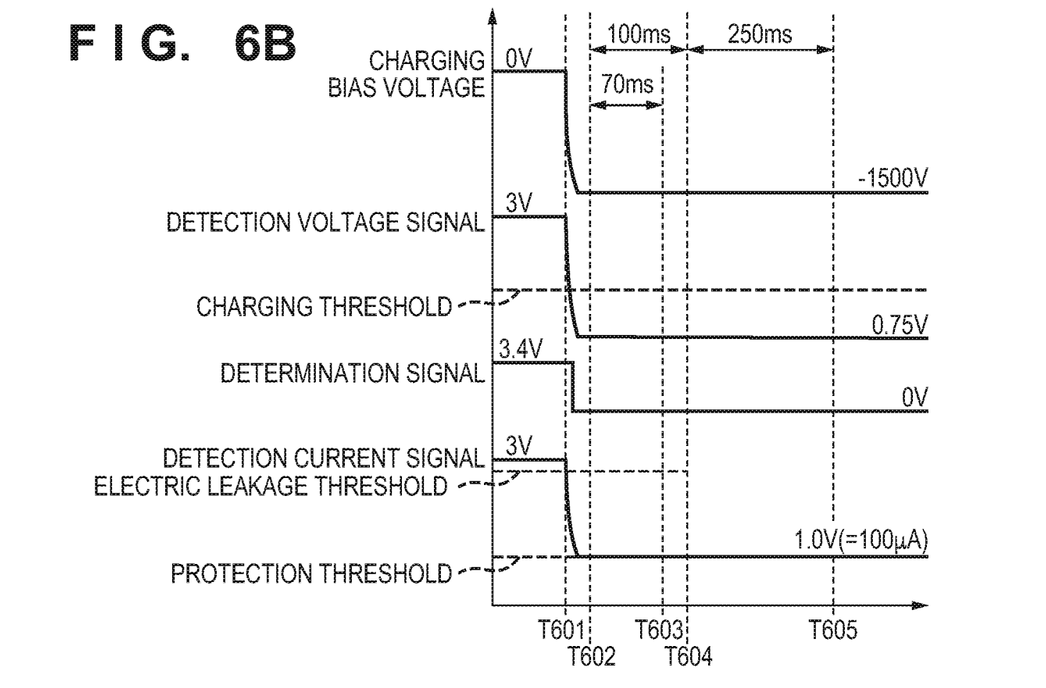

FIG. 6B is a timing chart of a case where there is a malfunction that the charging bias voltage is kept at an output maximum value. Note that this malfunction occurs due to a state in which the collector terminal and the emitter terminal of the transistor Q301 of the constant voltage control section 302 enter a short circuit state, for example. In the following, difference from the normal state illustrated in FIG. 6A will be mainly described.

In the present example, the collector terminal and the emitter terminal of the transistor Q301 are short-circuited, and therefore a voltage of 24 V is constantly applied to the transformer T301. Therefore, in a case where the control unit 101 outputs the drive CLK signal, the charging bias voltage reaches its maximum value, and the charging current also excessively flows. As a result, the overcurrent protection section 308 operates, and thereby the charging current is brought to 100 µA and the charging bias voltage is brought to −1500 V. The detection voltage signal at this time is 0.75 V. After that, at the timing T602 and the timing T604, for example, the control unit 101 changes a duty of the output setting signal. However, as described above, a value of each signal is not changed due to the short circuit of the transistor Q301 and the operation of the overcurrent protection section 308.

As illustrated in FIG. 6B, at the timings T603 and T605, the detection voltage signal is 0.75 V, which is lower than the charging threshold voltage, and therefore the determination signal is at a low level. Further, a voltage of the detection current signal is 1 V, which corresponds to the protection threshold voltage. In this manner, the control unit 101 can determine that the charging high-voltage circuit 300 has a malfunction that a charging bias voltage having a voltage value equal to or larger than a predetermined voltage value at which the current protection circuit 308 is caused to operate is output, in a case where the determination signal is at a low level at the timings T603 and T605 and a voltage of the detection current signal is equal to the protection threshold voltage.

Load Abnormality #1 (Large Electric Leakage Current)

Figure 7A:
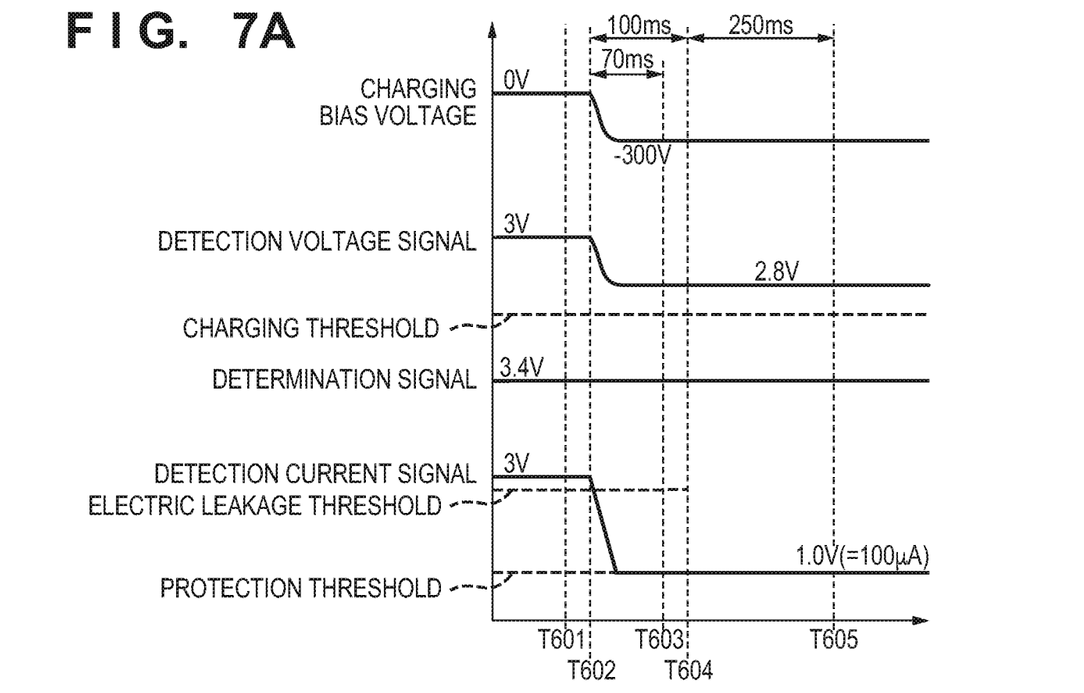
FIGS. 7A and 7B are explanatory drawings of respective signals in respective states.

FIG. 7A is a timing chart of a case where there is a load abnormality that a resistive current flows through a load of the charging high-voltage circuit 300, such as the charging roller 2, due to electric leakage caused due to condensation or the like. Note that, in the present example, the electric leakage current is excessive, and operation of the overcurrent protection section 308 is started due to the electric leakage current.

After the drive CLK signal is output, when the control unit 101 sets the output setting signal such that the charging bias voltage having the first target value is output, the overcurrent protection section 308 operates and the charging current is restricted to 100 µA, as described above. Note that, at this time, the charging bias voltage is −300 V, and the detection voltage signal is 2.8 V. Further, a voltage of the detection current signal is 1 V, which corresponds to the protection threshold voltage. After that, at the timing T602 and the timing T604, for example, the control unit 101 changes a duty of the output setting signal. However, as described above, a value of each signal is not changed due to operation of the overcurrent protection section 308.

As illustrated in FIG. 7A, at the timings T603 and T605, the detection voltage signal is higher than 2.8 V, and therefore the determination signal is at a high level. This brings a voltage of the detection current signal to a voltage equal to the protection threshold voltage. Therefore, the control unit 101 can determine that there is a load abnormality that an excessive electric leakage current flows, in a case where the determination signal is at a high level and a voltage of the detection current signal is the protection threshold voltage at the timings T603 and T605.

Load Abnormality #2 (Small Electric Leakage Current)

Figure 7B:
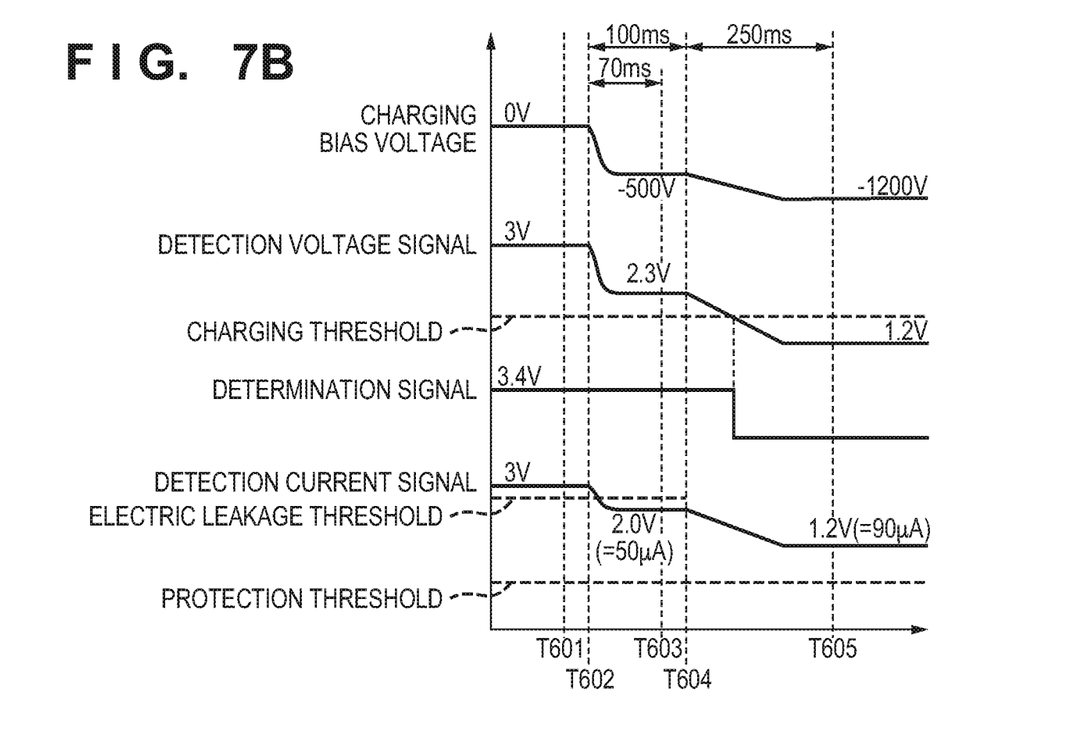

FIG. 7B is a timing chart of a case where a load abnormality similar to the load abnormality of FIG. 7A occurs, in which case, however, operation of the overcurrent protection section 308 is not caused by an electric leakage current.

In the present example, after the drive CLK signal is output, when the control unit 101 sets the output setting signal at the timing T602, the charging high-voltage circuit 300 outputs the charging bias voltage having the first target value (−500 V). When the apparatus is normal, the charging current does not flow at this stage. In the present example, however, the charging current of 50 µA flows due to electric leakage. This charging current of 50 µA brings a voltage of the detection current signal to a voltage of 2 V, which is equal to or less than the electric leakage threshold voltage. Further, in the present example, in a case where the charging bias voltage has the second target value (−1200 V), the charging current is increased by 40 µA due to electric leakage, and the charging current of 90 µA flows. In this case, a voltage of the detection current signal is 1.2 V.

As illustrated in FIG. 7B, in the present example, the determination signal is at a high level at the timing T603, and the determination signal is at a low level at the timing T605. Meanwhile, at the timing T603 and the timing T605, a voltage of the detection current signal is higher than the protection threshold voltage, but is smaller than the electric leakage threshold voltage. Therefore, the control unit 101 determines that there is a load abnormality in a degree of preventing the overcurrent protection section 308 from operating, in a case where the determination signal is at a high level and a low level at the timings T603 and T605, respectively, but a voltage of the detection current signal is between the protection threshold voltage and the electric leakage threshold voltage at both those timings.

Malfunction of Charging High-Voltage Circuit #2 (No Output)

Figure 8A:
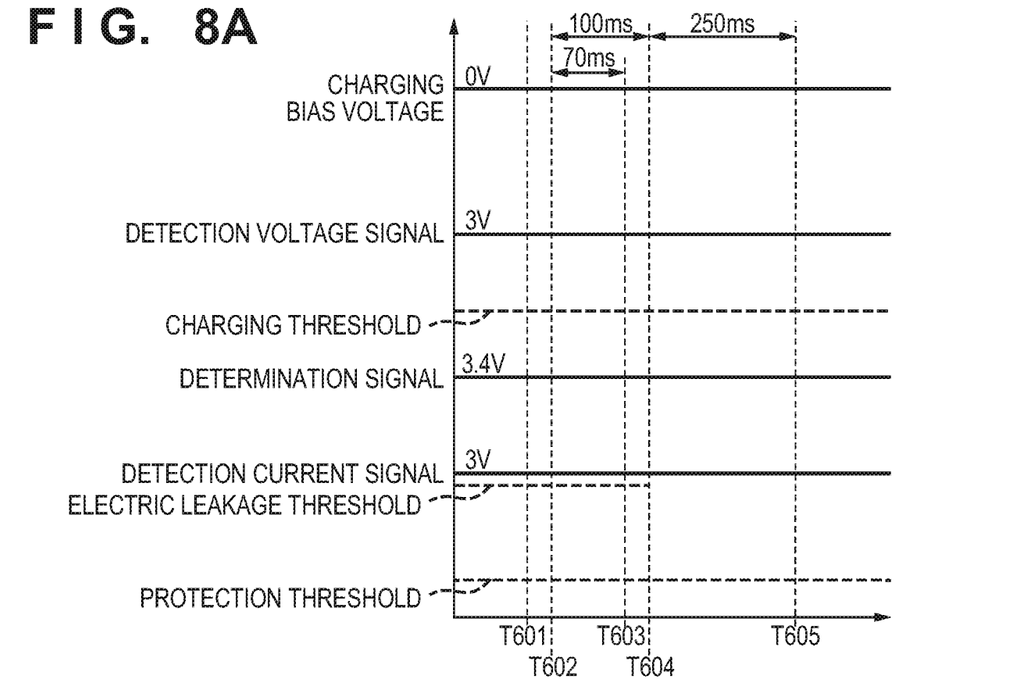
FIGS. 8A and 8B are explanatory drawings of respective signals in respective states.

FIG. 8A is a timing chart of a case where there is a malfunction that the charging bias voltage is not output. Note that this malfunction occurs due to a state in which a drain and a source of the FET Q303 of the overcurrent protection section 308 enter a short circuit state, for example.

Due to the short circuit state of the FET Q303 of the overcurrent protection section 308, the FET Q302 is not in a conduction state. Thus, in the present example, the charging bias voltage is not output. Therefore, none of the detection voltage signal, the determination signal, and the detection current signal is changed.

Therefore, it can be determined that the charging bias voltage is not output, in a case where the determination signal is at a high level and a voltage of the detection current signal is larger than the electric leakage threshold voltage at the timings T603 and T605.

Load Abnormality #3 (Attachment Failure of Photosensitive Member)

Figure 8B:
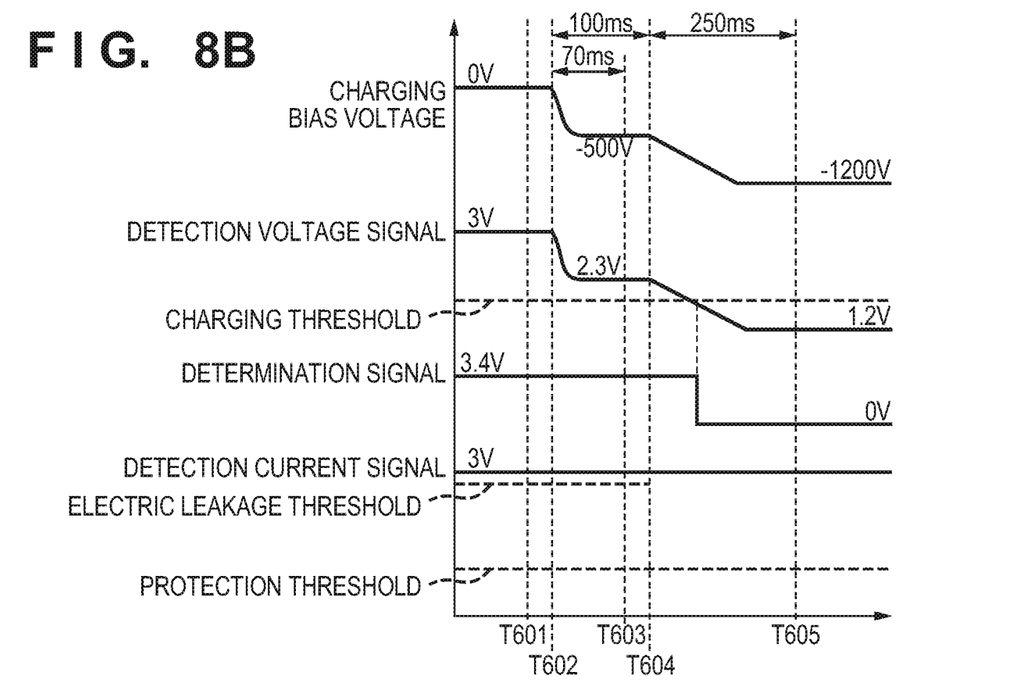

FIG. 8B is a timing chart of a case where the photosensitive member 1 has an attachment failure. Note that the case where the photosensitive member 1 has an attachment failure includes a case where the photosensitive member 1 is not attached, and a case where the charging current does not flow due to a contact failure although the photosensitive member 1 is attached.

In the present example, there is no problem in output of the charging bias voltage, and therefore the detection voltage signal and the determination signal are the same as those in a normal state. However, the detection current signal does not change since the charging current does not flow due to an attachment failure of the photosensitive member 1. Therefore, the control unit 101 can determine an attachment failure of the photosensitive member 1, in a case where the determination signal is at a high level and a low level at the timings T603 and T605, respectively, but the detection current signal is higher than the electric leakage threshold voltage as well.

Figure 9:
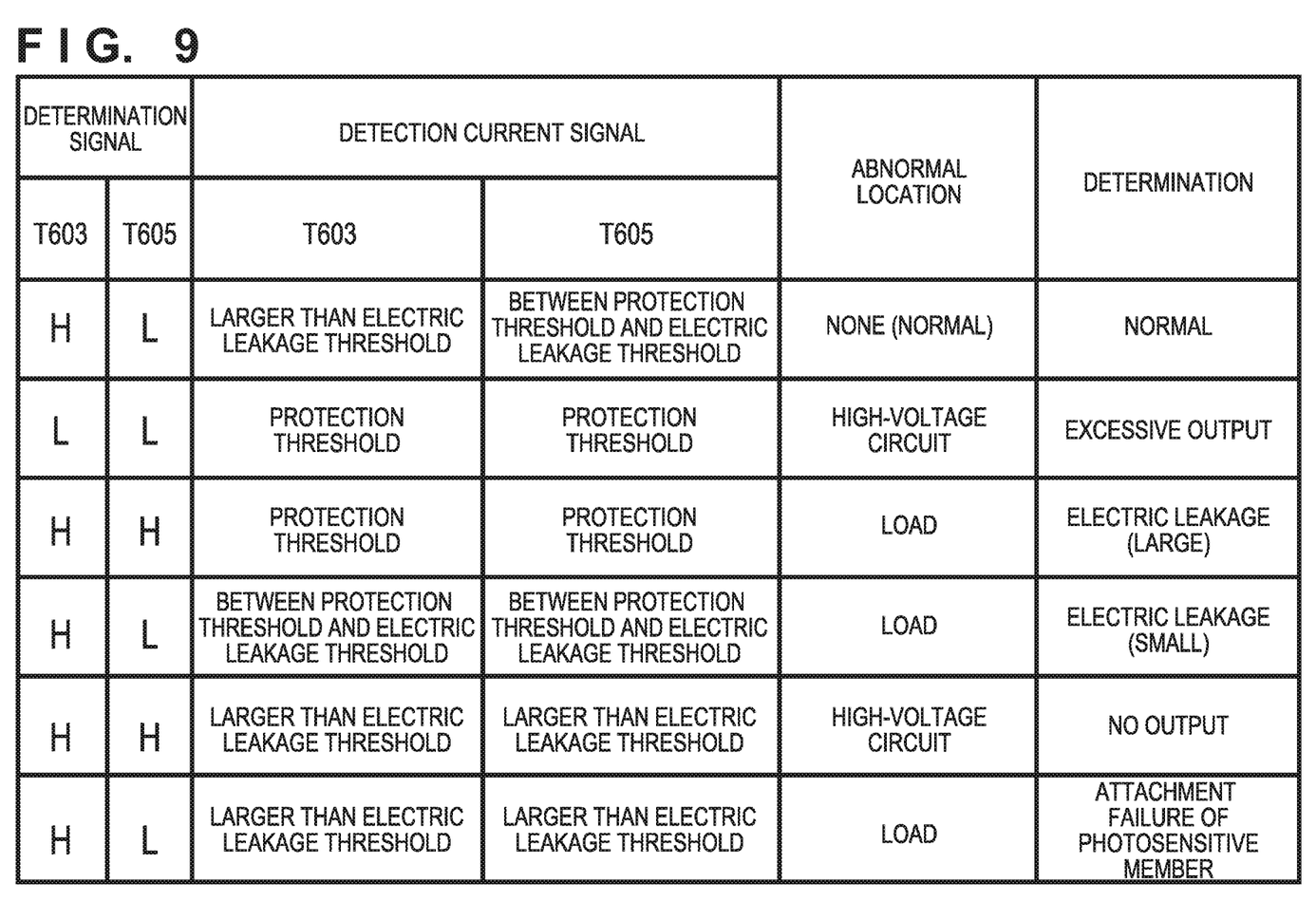
FIG. 9 is a table illustrating a relationship between a malfunction content, a determination signal, and a detection current signal.

FIG. 9 is a table in which the respective states described with reference to FIG. 6A, FIG. 6B, FIG. 7A, FIG. 7B, FIG. 8A, and FIG. 8B are summarized. As illustrated in FIG. 9, based on combinations of the determination signal and the detection current signal at the timings T603 and T605, an output abnormality (excessive output and no output) of the charging high-voltage circuit 300 and a load abnormality (including an attachment failure of the photosensitive member 1) can be determined separately from each other. Note that, in the present embodiment, a voltage of the detection current signal is smaller as the charging current is larger. Therefore, when replacing to a current value of the charging current, a relationship of values between the detection current signal and a threshold of FIG. 9 is in an inverse relationship. For example, concerning a load abnormality due to electric leakage, the control unit 101 determines that electric leakage occurs due to a load abnormality, in a case where the determination signal is at a high level and the charging current is equal to or larger than a threshold of electric leakage, i.e., equal to or larger than 10 µA, at the timing T603. Note that it can be determined that the electric leakage current is small in a case where the charging current is smaller than 100 µA at the time of operation of the overcurrent protection section 308, and that the charging current is large in a case where the charging current is 100 µA.

Note that, as illustrated in FIG. 9, only in a case of Load Abnormality #2 (Small Electric Leakage Current), at the timing T603, the determination signal is at a high level, but the detection current signal has a voltage between the protection threshold voltage and the electric leakage threshold voltage. Therefore, the control unit 101 can determine that there is a load abnormality in a degree of preventing the overcurrent protection section 308 from operating, in a case where the determination signal is at a high level and the detection current signal has a voltage between the protection threshold voltage and the electric leakage threshold voltage at the timing T603. Similarly, only in a case of Load Abnormality #1, at the timing T603, the determination signal is at a high level, but the detection current signal has the protection threshold voltage. Therefore, the control unit 101 can determine that there is such a load abnormality as to cause the overcurrent protection section 308 to operate, in a case where the determination signal is at a high level and the detection current signal has the protection threshold voltage at the timing T603. Further, only in a case of excessive output, at the timing T603, the determination signal is at a low level, and the detection current signal has the protection threshold voltage. Therefore, the control unit 101 can determine that the charging current is excessive, in a case where the determination signal is at a low level and the detection current signal has the protection threshold voltage at the timing T603. Note that, in a case where the overcurrent protection section 308 is omitted, a value of the detection current signal may be smaller than the protection threshold voltage. Specifically, the charging current may be larger than 100 µA, which is a value at which the overcurrent protection section 308 is caused to operate.

Figure 10:
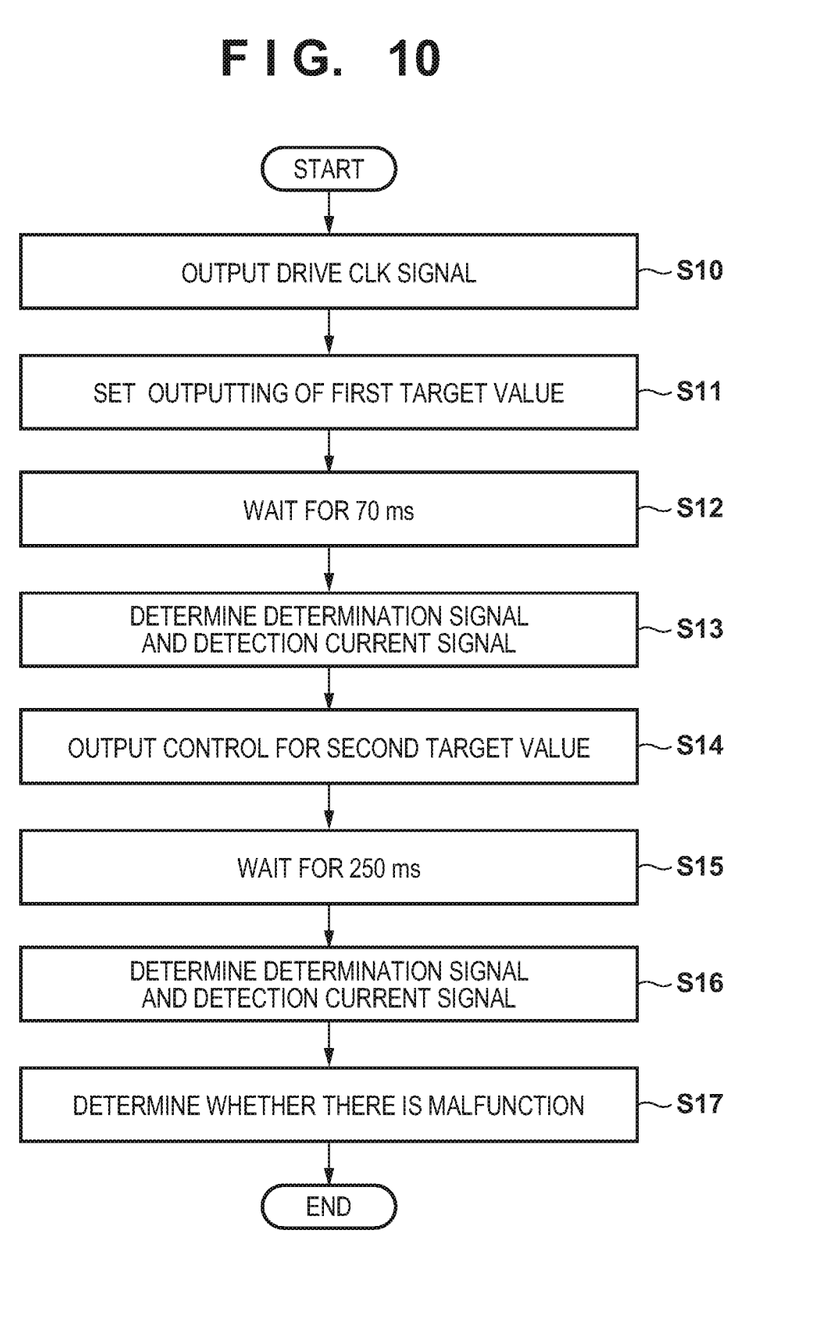
FIG. 10 is a flowchart of processing concerning malfunction detection.

FIG. 10 is a flowchart of image forming processing according to the present embodiment. In S10, the control unit 101 outputs a drive CLK signal. In S11, the control unit 101 sets an output setting signal such that a first target value is output as a control bias voltage. The control unit 101 waits for 70 ms in S12, and determines values of a determination signal and a detection current signal in S13. After that, in S14, the control unit 101 starts the slope control described above such that a value of a charging bias voltage is brought to a second target value. The control unit 101 waits for 250 ms in S15, and determines values of the determination signal and the detection current signal in S16. In S17, the control unit 101 determines a malfunction of the charging high-voltage circuit 300 and a malfunction of a load of the charging high-voltage circuit 300, based on determination results of S13 and S16. In a case where a malfunction is not detected, the control unit 101 executes image forming processing. On the other hand, in a case where a malfunction is detected, the control unit 101 stops image forming processing. Then, for example, a malfunction content determined according to the table of FIG. 9 is displayed for a user. Note that, as described above, depending on a malfunction content, the control unit 101 can determine a malfunction content, only based on a determination result of S13. Therefore, the control unit 101 can have a configuration that, in a case where the control unit 101 successfully determines a malfunction content in S13, the control unit 101 stops the processing of FIG. 10 at that time point, and the control unit 101 notifies a user of the malfunction content.

According to the configuration described above, an output abnormality (excessive output and no output) of the charging high-voltage circuit 300 and a load abnormality (including an attachment failure of the photosensitive member 1) can be determined separately from each other. Further, in the present embodiment, outputs to the control unit 101 by each charging high-voltage circuit 300 are only the detection current signal, which is an analog signal, and the determination signal, which is a digital signal (binarized signal). Therefore, in a semiconductor IC such as an ASIC, it is sufficient that only one analog port and one digital port be provided for each charging high-voltage circuit 300. In this manner, costs and a substrate size can be reduced.

Note that the present invention can be applied to a case of making a distinction between a malfunction of a power supply circuit that generates various bias voltages used by an image forming apparatus and an abnormality in a load of the power supply circuit, as well as the charging high-voltage circuit 300 that generates a charging bias voltage. Further, the present invention can also be applied to various apparatuses other than an image forming apparatus. Specifically, as illustrated in FIG. 2, in the present invention, a control unit 101, and a power supply circuit (charging high-voltage circuit 300) that generates bias voltages are provided. The present invention can be implemented as a power supply apparatus that supplies the bias voltages to a load. The power supply apparatus can be used in various apparatuses.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-171677, filed on Sep. 13, 2018 which is hereby incorporated by reference herein in its entirety.

What is claimed is:

1. A power supply apparatus comprising:
a power supply circuit configured to generate a bias voltage and output the bias voltage to a load, the power supply circuit being configured to output a determination signal and a detection current signal, the determination signal being binarized and representing a result obtained by comparing a voltage value according to the bias voltage with a threshold, the detection current signal indicating a current value of a load current flowing between the power supply circuit and the load, the load current flowing in response to outputting of the bias voltage to the load; and
a controller configured to control generation of the bias voltage generated by the power supply circuit, and determine a malfunction of the power supply circuit and an abnormality in the load, based on the determination signal and the detection current signal,
wherein:
the controller causes the power supply circuit to generate the bias voltage having a first voltage value at which the load current does not flow at a first timing, and causes the power supply circuit to generate the bias voltage having a second voltage value at which the load current flows at a second timing, and
the controller determines a malfunction of the power supply circuit and an abnormality in the load, based on the determination signal and the detection current signal at a third timing and the determination signal and the detection current signal at a fourth timing, the third timing being a timing during time in which the power supply circuit is caused to generate the bias voltage having the first voltage value, the fourth timing being a timing during time in which the power supply circuit is caused to generate the bias voltage having the second voltage value.

2. The power supply apparatus according to claim 1, wherein:
the controller compares a current value indicated by the detection current signal at the third timing with a first threshold and a second threshold larger than the first threshold, and compares a current value indicated by the detection current signal at the fourth timing with the first threshold and the second threshold, and
the controller determines that the power supply circuit and the load are normal, in a case where the determination signal has a first value and a current value indicated by the detection current signal is smaller than the first threshold at the third timing, and the determination signal has a second value and a current value indicated by the detection current signal is larger than the first threshold and smaller than the second threshold at the fourth timing.

3. The power supply apparatus according to claim 2, wherein the controller determines a malfunction of the power supply circuit, in a case where the determination signal has the second value and a current value indicated by the detection current signal is equal to or larger than the second threshold at the third timing.

4. The power supply apparatus according to claim 3, wherein the controller determines that the power supply circuit outputs a value larger than a predetermined voltage value as the bias voltage, in a case where the determination signal has the second value and a current value indicated by the detection current signal is equal to or larger than the second threshold at the third timing.

5. The power supply apparatus according to claim 2, wherein the controller determines an abnormality in the load, in a case where the determination signal has the first value and a current value indicated by the detection current signal is equal to or larger than the first threshold at the third timing.

6. The power supply apparatus according to claim 5, wherein the controller determines that the load current having a current value of the first threshold or larger is flowing due to electric leakage of the load, in a case where the determination signal has the first value and a current value indicated by the detection current signal is equal to or larger than the first threshold at the third timing.

7. The power supply apparatus according to claim 2, wherein the controller determines a malfunction of the power supply circuit, in a case where the determination signal has the first value and a current value indicated by the detection current signal is smaller than the first threshold at the third timing, and the determination signal has the first value and a current value indicated by the detection current signal is smaller than the first threshold at the fourth timing.

8. The power supply apparatus according to claim 7, wherein the controller determines that the power supply circuit does not output the bias voltage, in a case where the determination signal has the first value and a current value indicated by the detection current signal is smaller than the first threshold at the third timing, and the determination signal has the first value and a current value indicated by the detection current signal is smaller than the first threshold at the fourth timing.

9. The power supply apparatus according to claim 2, wherein the controller determines an abnormality in the load, in a case where the determination signal has the first value and a current value indicated by the detection current signal is smaller than the first threshold at the third timing, and the determination signal has the second value and a current value indicated by the detection current signal is smaller than the first threshold at the fourth timing.

10. The power supply apparatus according to claim 9, wherein the controller determines that the load has an attachment failure, in a case where the determination signal has the first value and a current value indicated by the detection current signal is smaller than the first threshold at the third timing, and the determination signal has the second value and a current value indicated by the detection current signal is smaller than the first threshold at the fourth timing.

11. The power supply apparatus according to claim 2, wherein the power supply circuit comprises a protection circuit configured to keep an upper limit of the load current at or below the second threshold even when a resistance value of the load is reduced.

12. The power supply apparatus according to claim 2, wherein:
the second timing is a timing after the first timing, and
the controller prevents the power supply circuit from generating the bias voltage having the second voltage value in any of a case where the determination signal has the second value and a current value indicated by the detection current signal is equal to or larger than the second threshold at the third timing, and a case where the determination signal has the first value and a current value indicated by the detection current signal is equal to or larger than the first threshold at the third timing.

13. An image forming apparatus comprising:
an image forming unit configured to form an image on a sheet;
a power supply circuit configured to generate a bias voltage and output the bias voltage to a load of the image forming unit, the power supply circuit being configured to output a determination signal and a detection current signal, the determination signal being binarized and representing a result obtained by comparing a voltage value according to the bias voltage with a threshold, the detection current signal indicating a current value of a load current flowing between the power supply circuit and the load, the load current flowing in response to outputting of the bias voltage to the load; and
a controller configured to determine a malfunction of the power supply circuit and an abnormality in the load, based on the determination signal and the detection current signal,
wherein:
the controller causes the power supply circuit to generate the bias voltage having a first voltage value at which the load current does not flow at a first timing, and causes the power supply circuit to generate the bias voltage having a second voltage value at which the load current flows at a second timing, and
the controller determines a malfunction of the power supply circuit and an abnormality in the load, based on the determination signal and the detection current signal at a third timing and the determination signal and the detection current signal at a fourth timing, the third timing being a timing during time in which the power supply circuit is caused to generate the bias voltage having the first voltage value, the fourth timing being a timing during time in which the power supply circuit is caused to generate the bias voltage having the second voltage value.

14. The image forming apparatus according to claim 13, wherein:
the image forming unit includes a photosensitive member, and
the bias voltage is used to charge the photosensitive member.

15. The image forming apparatus according to claim 14, wherein:
the image forming unit further comprises a charging roller to which the bias voltage is supplied, and
the load comprises the charging roller and the photosensitive member.

* * * * *